(12) United States Patent
Song et al.

(10) Patent No.: US 8,706,845 B2
(45) Date of Patent: Apr. 22, 2014

(54) METHOD, APPARATUS, AND SYSTEM FOR MAINTAINING STATUS OF BOOTSTRAP PEER

(75) Inventors: Haibin Song, Shenzhen (CN); Xingfeng Jiang, Shenzhen (CN); Haifeng Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 12/960,187

(22) Filed: Dec. 3, 2010

(65) Prior Publication Data

US 2011/0078489 A1 Mar. 31, 2011

Related U.S. Application Data

(63) Continuation of application No. PCT/CN2009/071974, filed on May 26, 2009.

(30) Foreign Application Priority Data

Jun. 27, 2008 (CN) .......................... 2008 1 0127547

(51) Int. Cl.
    *G06F 15/177* (2006.01)
(52) U.S. Cl.
    USPC .......................................... 709/220; 370/254
(58) Field of Classification Search
    None
    See application file for complete search history.

(56) References Cited

U.S. PATENT DOCUMENTS

| | | | |
|---|---|---|---|
| 2003/0005096 A1* | 1/2003 | Paul et al. | 709/222 |
| 2004/0128151 A1* | 7/2004 | Mock et al. | 705/1 |
| 2007/0211703 A1* | 9/2007 | Gu et al. | 370/356 |
| 2009/0080344 A1* | 3/2009 | Park et al. | 370/254 |
| 2009/0083861 A1* | 3/2009 | Jones | 726/29 |
| 2009/0177772 A1 | 7/2009 | Guan | |

FOREIGN PATENT DOCUMENTS

| | | | |
|---|---|---|---|
| CN | 1874284 A | 12/2006 | |
| CN | 1925444 A | 3/2007 | |
| CN | 1968164 A | 5/2007 | |
| CN | 101150465 A | 3/2008 | |
| WO | WO 2007066999 A1 | 6/2007 | |
| WO | 2007/121612 A1 | 11/2007 | |
| WO | WO 2009141013 A1 * | 11/2009 | H04L 29/08 |

OTHER PUBLICATIONS

Written Opinion of the International Searching Authority issued in corresponding PCT Patent Application No. PCT/CN2009/071974, mailed Sep. 3, 2009.

(Continued)

*Primary Examiner* — Chirag Shah
*Assistant Examiner* — Rina Pancholi
(74) *Attorney, Agent, or Firm* — Brinks Gilson & Lione (57) ABSTRACT

A method for maintaining the status of a bootstrap peer includes: selecting a bootstrap peer; obtaining the status information of the bootstrap peer; updating a local bootstrap peer list according to the status information of the bootstrap peer. An apparatus and system for maintaining the status of a bootstrap peer are also disclosed. The bootstrap peer list is updated according to the status information of the selected bootstrap peer, which ensures the validity of the bootstrap peer list on the bootstrap server so that the information in the bootstrap peer list obtained by a joining peer is valid. This improves the success rate of joining the overlay network by the joining peer, shortens the joining process time of the joining peer, and implements load balancing between the bootstrap peers.

18 Claims, 6 Drawing Sheets

(56) References Cited

OTHER PUBLICATIONS

Office Action issued in corresponding Chinese Patent Application No. 200810127547.2, mailed Nov. 9, 2011.
"A Web Service Discovery Mechanism Based on Peer-to-Peer Network", Dissertation submitted to HoHai University in fulfillment of the Requirement for the Degree of Master in Engineering, Dec. 17, 2006.
"A Decentralized Grid Resource Discovery Scheme based on Resource Classification", Jan. 8, 2004.
Jennings, C. et al. "Resource Location and Discovery (RELOAD) Base Protocol draft0ietf-p2psip-base-12" Internet Engineering Task Force (IETF). Nov. 10, 2010.
International Search Report issued in corresponding PCT Application No. PCT/CN2009/071974; mailed Sep. 3, 2009.
Office Action issued in corresponding Chinese Patent Application No. 200810127547.2, mailed May 21, 2012.
Office Action issued in corresponding Chinese Patent Application No. 200810127547.2, mailed Nov. 20, 2012.

* cited by examiner

METHOD, APPARATUS, AND SYSTEM FOR MAINTAINING STATUS OF BOOTSTRAP PEER

CROSS-REFERENCE TO RELATED APPLICATIONS

This application is a continuation of International Application No. PCT/CN2009/071974, filed on May 26, 2009, which claims priority to Chinese patent application No. 200810127547.2, filed on Jun. 27, 2008, both of which are hereby incorporated by reference in their entireties.

FIELD OF THE APPLICATION

The present application relates to a network technology, and in particular to a method, apparatus, and system for maintaining the status of a bootstrap peer.

BACKGROUND

A peer to peer (P2P) network is a self-organizing network. A peer is a node on a P2P overlay network and provides the distributed resource storing and P2P message routing function. If a peer (hereinafter referred to as the joining peer) needs to join a P2P overlay network, it needs to obtain the information about a peer on this overlay network. Then, the peer joins the overlay network through this peer on the overlay network. The peer on the overlay network that the joining peer firstly connects to is a bootstrap peer. The bootstrap peer may be a common peer, or a peer deployed by a service provider.

The Internet Engineering Task Force P2P Session Initiation Protocol (IETF P2PSIP) working group proposes the method for obtaining the information about the bootstrap peer through a bootstrap server. The work process is as follows:

First, the joining peer sends a query request to the bootstrap server, and obtains a bootstrap peer list returned by the bootstrap server.

Then, the joining peer sends a join request to the peer (namely, the bootstrap peer) in the obtained bootstrap peer list.

After receiving the request, the bootstrap peer forwards the join request on the P2P overlay network to a responsible peer on the P2P overlay network so as to help the joining peer to join the overlay network.

The processing procedure in the prior art is as follows: Skype (instant messaging software) uses a few servers deployed worldwide as the bootstrap peers. All Skype clients save addresses of these supper bootstrap peers. A client may attempt to join the overlay network each time through a peer cached previously and existing on the overlay network. If the client fails to join the overlay network, the deployed well-known bootstrap peer may act as a reliable peer to help the client to join the P2P overlay network. The problem of the bootstrap peer failure does not exist because the function of the bootstrap peer is powerful and each bootstrap peer may process the join requests from a large number of clients at the same time.

One problem noted by this arrangement is that stable peers are deployed to act as the bootstrap peers. Therefore, the stability and reliability are determined by the deployed peers. Skype clients firstly attempt to join the overlay network through the cached peers that already exist on the P2P network during the last access. If these peers are not on the overlay network, an access delay is produced. In addition, in P2PSIP scenarios, the bootstrap peers may all be common peers. These peers may leave the overlay network anytime, and even become failed or busy. Consequently, the joining peer cannot access the network.

SUMMARY

In view of this, one or more embodiments, described below, are directed to a method, apparatus, and system for maintaining the status of a bootstrap peer so as to improve the success rate of joining a P2P overlay network by a peer and shorten the processing time of the joining peer.

Accordingly, one embodiment provides a method for maintaining the status of a bootstrap peer. The method includes:
 selecting a bootstrap peer;
 obtaining status information of the bootstrap peer; and
 updating a local bootstrap peer list according to the status information of the bootstrap peer.

One embodiment provides an apparatus for maintaining the status of a bootstrap peer. The apparatus includes:
 a selecting unit, configured to select a bootstrap peer;
 an obtaining unit, configured to obtain status information of the bootstrap peer; and
 a first updating unit, configured to update a local bootstrap peer list according to the status information of the bootstrap peer.

One embodiment provides a system for maintaining the status of a bootstrap peer. The system includes:
 the apparatus disclosed herein for maintaining the status of a bootstrap peer.

Compared with the prior art, these embodiments have at least the following advantages: Updating the bootstrap peer list according to the status information of a selected bootstrap peer ensures the validity of the bootstrap peer list on the bootstrap server so that the information in the bootstrap peer list obtained by a joining peer is valid. This improves the success rate of joining the overlay network by the joining peer and shortens the joining process time of the joining peer.

BRIEF DESCRIPTION OF THE DRAWINGS

The accompanying drawings are provided to aid in understanding the embodiments described below. The accompanying drawings are merely exemplary, and it is understood that persons having ordinary skill in the art can derive other drawings from such accompanying drawings without any creative effort.

DETAILED DESCRIPTION OF THE EMBODIMENTS

In the embodiments below, firstly role notification is performed between a bootstrap peer server and a bootstrap peer. Then, the bootstrap peer server subscribes to the status information from the bootstrap peer, or the bootstrap peer notifies the bootstrap peer server of the status information. This ensures the validity of the bootstrap peer on the bootstrap peer server, and realizes load balancing between bootstrap peers by using a scheduling policy in combination with the obtained status information of the bootstrap peer.

Figure 1:
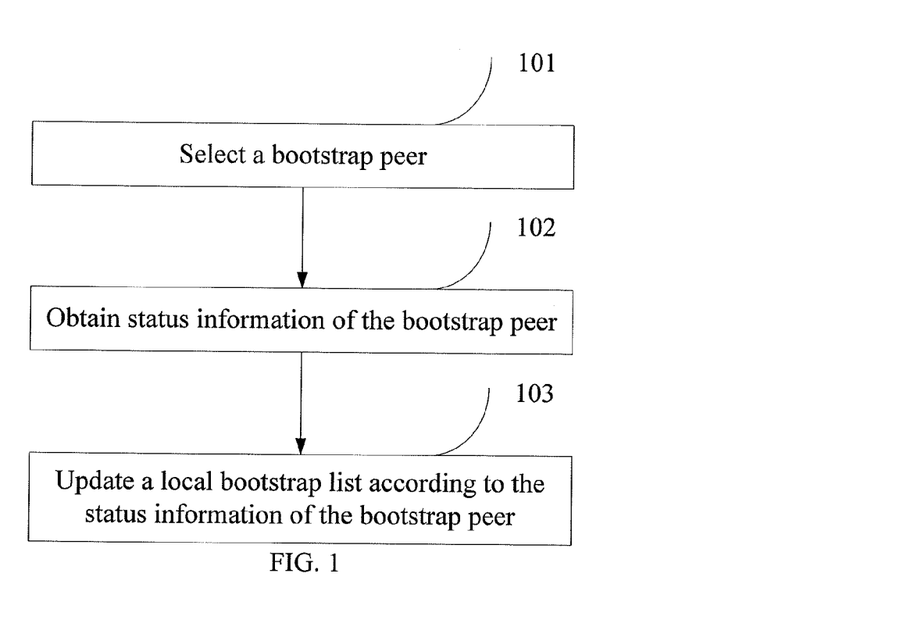
FIG. 1 is a flow chart of a method for maintaining the status of a bootstrap peer according to a first embodiment.

FIG. 1 is a flow chart of a method for maintaining the status of a bootstrap peer according to the first embodiment. The method includes the following steps:

101. A bootstrap peer is selected.

The selecting of a bootstrap peer may specifically include:
  selecting the bootstrap peer by means of autonomous election on a P2P overlay network; or
  with respect to the election result on the P2P overlay network, selecting the bootstrap peer according to a selection policy.

The bootstrap peer is selected by means of autonomous election on the P2P overlay network as follows: For example, the P2P network has a trust mechanism; the success and creditability of interactions between the peers affect the trust values of the peers; the trust value of each peer is stored on the overlay network in a distributed manner; and a peer may become a bootstrap peer only when the trust value of the peer is greater than a preset value. Other peers may obtain the trust value of this peer on the overlay network. The bootstrap peer may also be selected by other means. The peer selected on the P2P overlay network may directly act as a bootstrap peer. Also, the bootstrap peer server may reselect a bootstrap peer according to a certain policy.

When selecting the bootstrap peer, the bootstrap peer server selects a candidate bootstrap peer according to the peer information obtained from a registration server or peer information stored in other databases, such as bandwidth of the peer and information about whether the peer undergoes network address translation (NAT). The peer information needs to be obtained when the bootstrap peer server is to select the bootstrap peer.

102. The status information of the bootstrap peer is obtained. The status information includes: whether the bootstrap peer is busy, whether the bootstrap peer is leaving a P2P overlay network, the remaining central processing unit (CPU) processing capability, and available remaining bandwidth.

103. A local bootstrap peer list is updated according to the status information of the bootstrap peer. In the actual application, the updating manner may be as follows:

If the status information of the bootstrap peer is not received within a preset time, the bootstrap peer is deleted as a failed bootstrap peer.

Using the status information of the bootstrap peer, the updating manner may further include:
  updating the status information of the bootstrap peer in the local bootstrap peer list according to the status information of the bootstrap peer.

To ensure load balancing for each bootstrap peer, the updating manner may further include:
  adjusting the load between bootstrap peers according to the status information of each updated bootstrap peer.

A relatively idle bootstrap peer may be returned to the joining peer to take on the access task.

According to the embodiment, the bootstrap peer is selected, the status information of the bootstrap peer is obtained, and then the local bootstrap peer list is updated according to the status information of the bootstrap peer.

Updating the bootstrap peer list according to the status information of a selected bootstrap peer ensures the validity of the bootstrap peer list on the bootstrap server so that the information in the bootstrap peer list obtained by a joining peer is valid. This improves the success rate of joining the overlay network by the joining peer, shortens the joining process time of the joining peer, and realizes load balancing between the bootstrap peers.

Figure 2:
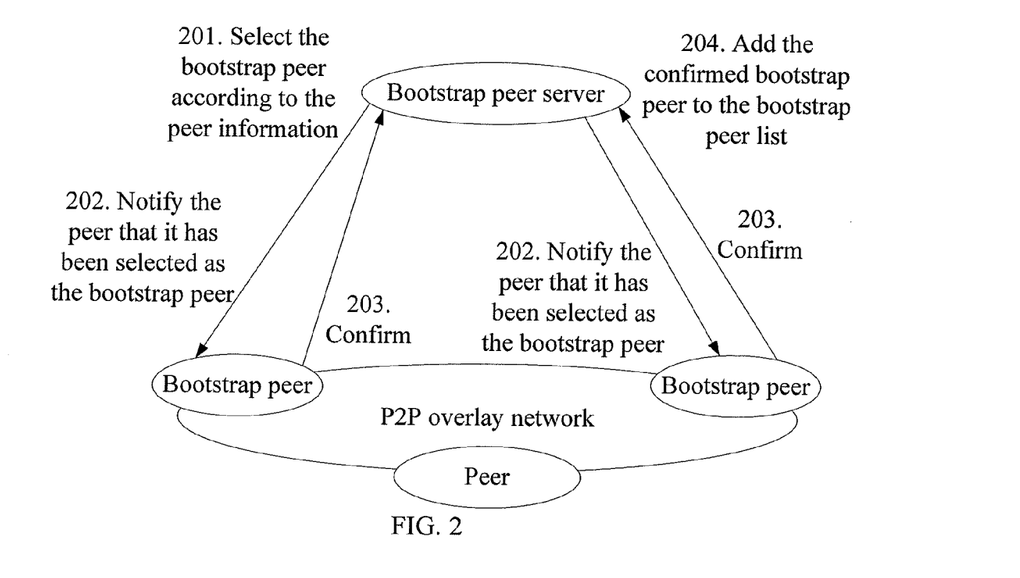
FIG. 2 is a flow chart of a method for maintaining the status of a bootstrap peer according to a second embodiment.

FIG. 2 illustrates the method according to the second embodiment. This embodiment describes the first way of notifying the role of the bootstrap peer, which includes the following steps:

201. The bootstrap peer server selects a bootstrap peer according to the peer information of all the online peers. For status notification, the bootstrap peer needs to confirm its role. In the process of the role notification illustrated in FIG. 2, the bootstrap peer server selects the bootstrap peer according to all the obtained peer information, such as the average online duration, CPU processing capability, whether the peer undergoes NAT (the IPv4 public network address is limited, and therefore the user having a private network address needs to use a NAT device to translate its private network address into a public network address to ensure the normal communication with the peer on the public network), and bandwidth of the peer. This peer information may be obtained from a registration server or a diagnosis server, or may be obtained from the locally stored information.

In the actual application, the selecting of the bootstrap peer may include:
  obtaining the peer information and selecting a candidate bootstrap peer according to the peer information, where the candidate bootstrap peer may be selected according to information such as the bandwidth of the peer, CPU processing capability, and whether the peer undergoes NAT;
  sending a notification message to the candidate bootstrap peer; and
  selecting the candidate bootstrap peer as the bootstrap peer after receiving a confirmation message from the candidate bootstrap peer.

In the actual application, the peer information may be obtained in many ways. To be specific, the obtaining of the peer information may include:
  obtaining the peer information from a registration server, a diagnosis server, or locally stored peer information, where the peer information refers to the information about the online peers joining the P2P overlay network, and the bootstrap peer is selected from these online peers.

202. A notification message is sent to the selected peer to notify that it has been selected as a bootstrap peer.

203. The selected bootstrap peer returns a confirmation message.

204. The bootstrap peer server adds the confirmed bootstrap peer to the local bootstrap peer list. Besides the case shown in FIG. 2, a possible case is that the selected peer does not return the confirmation message for the reason of leaving or for other reasons, and that the bootstrap peer server does not add the peer which does not return the confirmation message to the bootstrap peer list.

Figure 3:
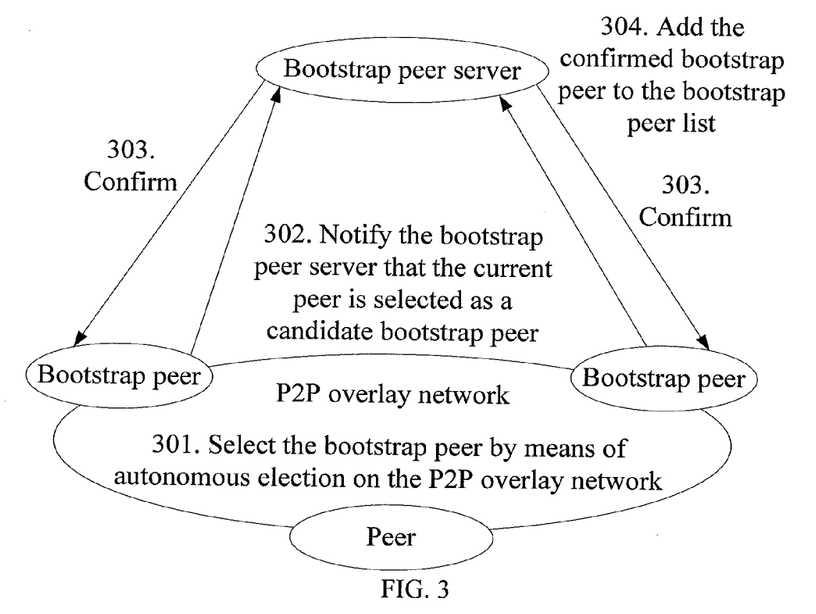
FIG. 3 is a flow chart of a method for maintaining the status of a bootstrap peer according to a third embodiment.

FIG. 3 illustrates the method according to the third embodiment. This embodiment describes the second way of notifying the role of the bootstrap peer. To be specific, the candidate bootstrap peer is selected by means of autonomous election on the P2P overlay network, which includes as follows.

301. The candidate bootstrap peer is selected by means of autonomous election on the P2P overlay network.

302. The selected candidate bootstrap peer sends a notification message to the bootstrap peer server to notify the server that it has been selected as a candidate bootstrap peer.

303. After receiving the notification message, the bootstrap peer server decides whether to select the current peer as the bootstrap peer according to a policy such as the history behavior record of the candidate bootstrap peer. The bootstrap peer server returns a confirmation message to the bootstrap peer which has the required capability and adds the contact information of the selected bootstrap peer to the bootstrap peer list. Otherwise, the bootstrap peer server does not confirm, or sends a reject response.

Figure 4:
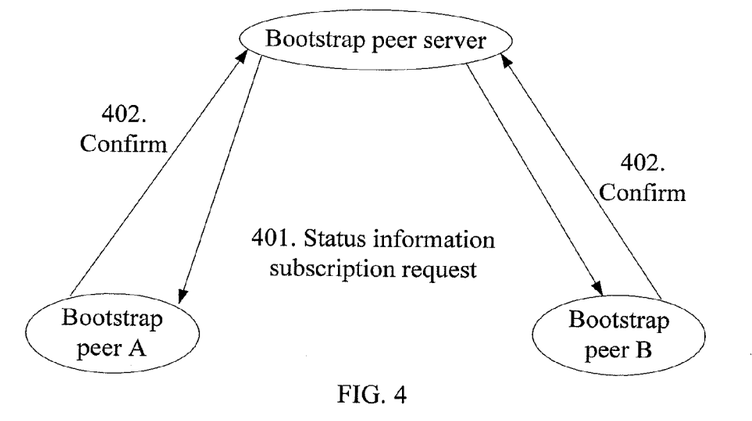
FIG. 4 is a flow chart of a method for maintaining the status of a bootstrap peer according to the third embodiment.
Figure 5:
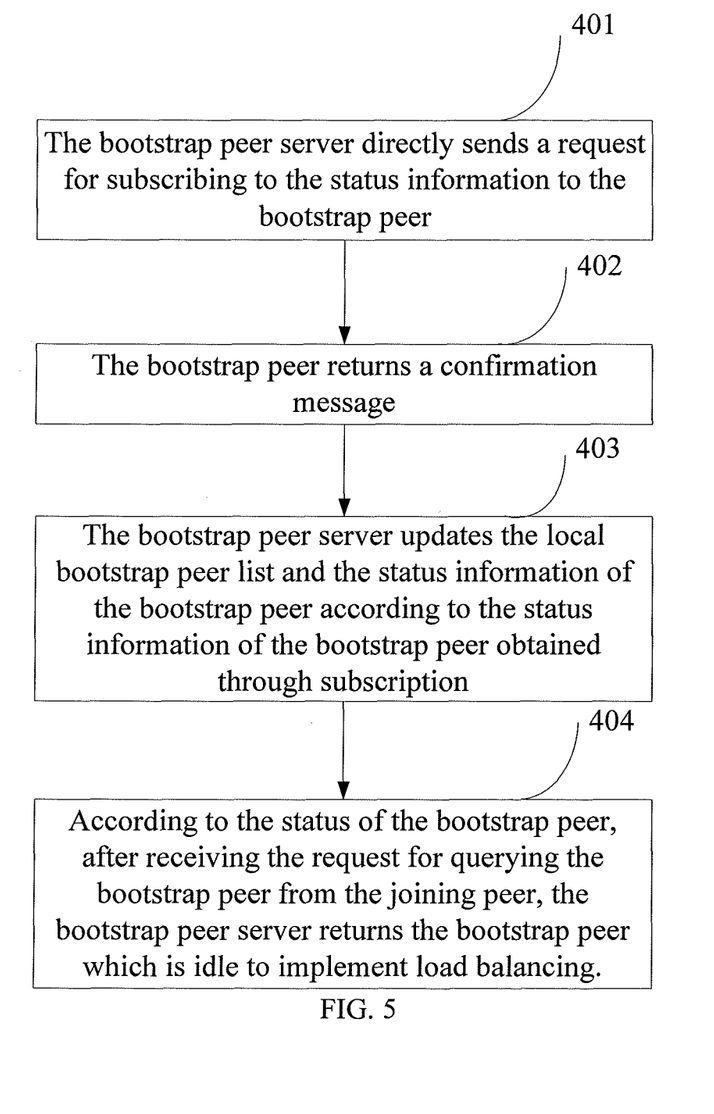
FIG. 5 is a flow chart of a method for maintaining the status of a bootstrap peer according to the third embodiment.

FIG. 4 and FIG. 5 illustrate the method according to the fourth embodiment. This embodiment describes a process in which the bootstrap peer server obtains the status information of the bootstrap peer through subscription.

According to the methods described in the second and third embodiments, after the role of the bootstrap peer is determined, the bootstrap peer server obtains the status information of the bootstrap peer through subscription. During this process, the direct subscription may be used. The method includes the following steps:

401. The bootstrap peer server sends a request for subscribing to the status information of the bootstrap peer to the bootstrap peer.

402. The bootstrap peer returns a confirmation message. When the status of the bootstrap peer is changed or the bootstrap peer leaves the P2P overlay network, the bootstrap peer notifies the bootstrap peer sever immediately. The subscription mechanism also provides a keep-alive method to ensure that the bootstrap peer server can detect the failure of the bootstrap peer.

403. The bootstrap peer server obtains the status information of the bootstrap peer through subscription, updates the local bootstrap peer list and the status information of the bootstrap peer, deletes the bootstrap peer that has failed or does not satisfy the conditions from the list, and sends a message to notify the peer that does not satisfy the conditions that the role of the bootstrap peer is cancelled. This ensures that the bootstrap peer stored on the bootstrap peer server is valid.

404. According to the status of the bootstrap peer, after receiving the request for querying the bootstrap peer from the joining peer, the bootstrap peer server returns the bootstrap peer which is idle to realize load balancing.

Figure 6:
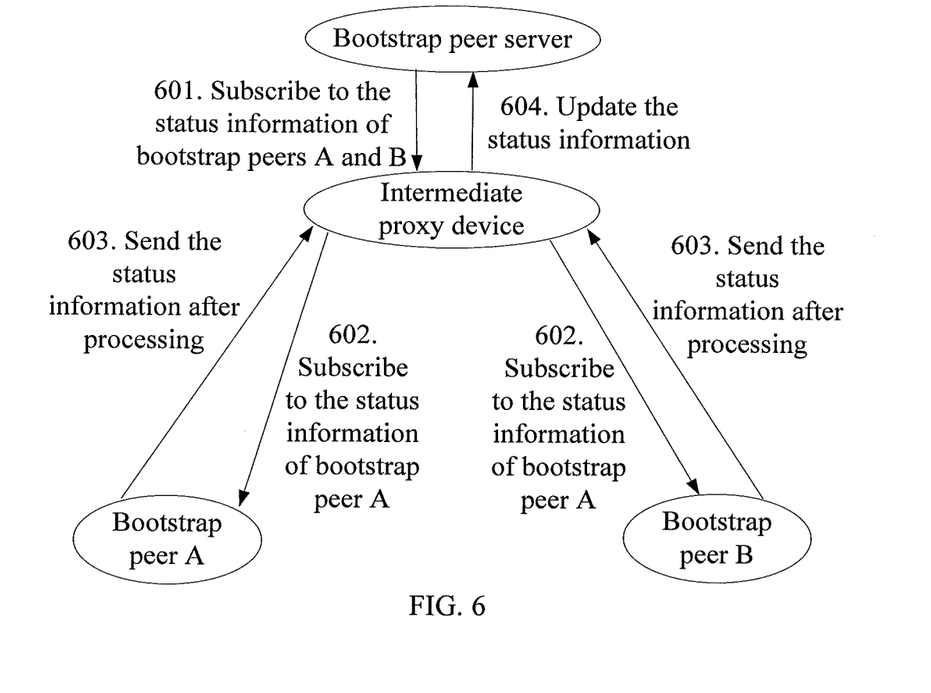
FIG. 6 is a flow chart of a method for maintaining the status of a bootstrap peer according to a fourth embodiment.

FIG. 6 illustrates the method according to the fifth embodiment. This embodiment describes another process of subscribing to the status information of the bootstrap peer. The status subscription process may also be implemented through an intermediate proxy device or system. The process includes the following steps:

601. The bootstrap peer server subscribes to the status information of the bootstrap peer from the intermediate proxy device/system. The subscription to the status information may be directed to an individual bootstrap peer or to multiple bootstrap peers.

602. The intermediate proxy device/system sends a status subscription request to the bootstrap peer according to the subscription request of the bootstrap peer server.

603. After receiving the latest status information of the bootstrap peer, the intermediate proxy device/system may perform processing such as combining, and then sends the status information to the bootstrap peer server.

604. The bootstrap peer server updates the local bootstrap peer list and the status information of the bootstrap peer according to the status information of the bootstrap peer. Then, the load balancing is realized according to the method of the fourth embodiment and the status information of the bootstrap peer. When the bootstrap peer server subscribes to the status information from an intermediate proxy device, such as a presence server, the presence server returns a subscription confirmation message to the bootstrap peer server if it accepts the subscription. When the intermediate proxy device subscribes to the status information from the user, similarly, the user returns a confirmation message indicating that the subscription is successful.

Particularly, the bootstrap peer, the bootstrap peer server, and the intermediate proxy device/system may run the presence protocol to implement the status subscription. In this case, the status code defined by the presence protocol and the mechanism of subscription and notification may be reused. That is, the status information is transferred through the presence protocol.

The status subscription is an active notification process by the bootstrap peer. After confirming its role by using the method provided in the second embodiment, the bootstrap peer may actively send the status notification message to the bootstrap peer server periodically. The status may also be notified through the intermediate proxy device/system. The bootstrap peer server considers that the bootstrap peer is failed if it fails to receive the status notification message from the bootstrap peer within a period of time. The bootstrap peer server updates the local bootstrap peer list according to the status information of the bootstrap peer, which ensures the validity of the bootstrap peer list. In addition, the load balancing between bootstrap peers is realized according to the method provided in the third embodiment.

Particularly, the bootstrap peer, the bootstrap peer server, and the intermediate proxy device/system may run the presence protocol to implement the status notification.

To be specific, according to the preceding embodiment, the obtaining of the status information of the bootstrap peer may include:

subscribing to the status information of the bootstrap peer directly; or subscribing to the status information of the bootstrap peer through an intermediate proxy device/intermediate proxy system.

The obtaining of the status information of the bootstrap peer may include:

receiving the periodically reported status information of the bootstrap peer; or receiving the status information of the bootstrap peer that is periodically reported by the bootstrap peer through the intermediate proxy device/intermediate proxy system.

Figure 7:
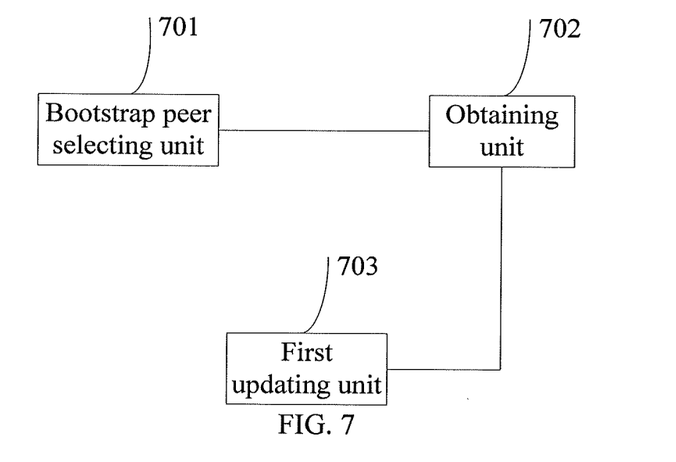
FIG. 7 is a block diagram of an apparatus for maintaining the status of a bootstrap peer according to the first embodiment.

FIG. 7 illustrates an apparatus for maintaining the status of a bootstrap peer according to the first embodiment. The apparatus includes:

a selecting unit 701, configured to select a bootstrap peer;

an obtaining unit 702, configured to obtain the status information of the bootstrap peer; and a first updating unit 703, configured to update a local bootstrap peer list according to the status information of the bootstrap peer.

Through the selecting unit 701, the bootstrap peer is selected; through the obtaining unit 702, the status information of the bootstrap peer is obtained; through the first updating unit 703, the local bootstrap peer list is updated according to the status information of the bootstrap peer. Updating the bootstrap peer list according to the status information of a selected bootstrap peer ensures the validity of the bootstrap peer list on the bootstrap server so that the information in the bootstrap peer list obtained by a joining peer is valid. This improves the success rate of joining the overlay network by the joining peer, shortens the joining process time of the joining peer, and realizes the load balancing, between bootstrap peers.

Figure 8:
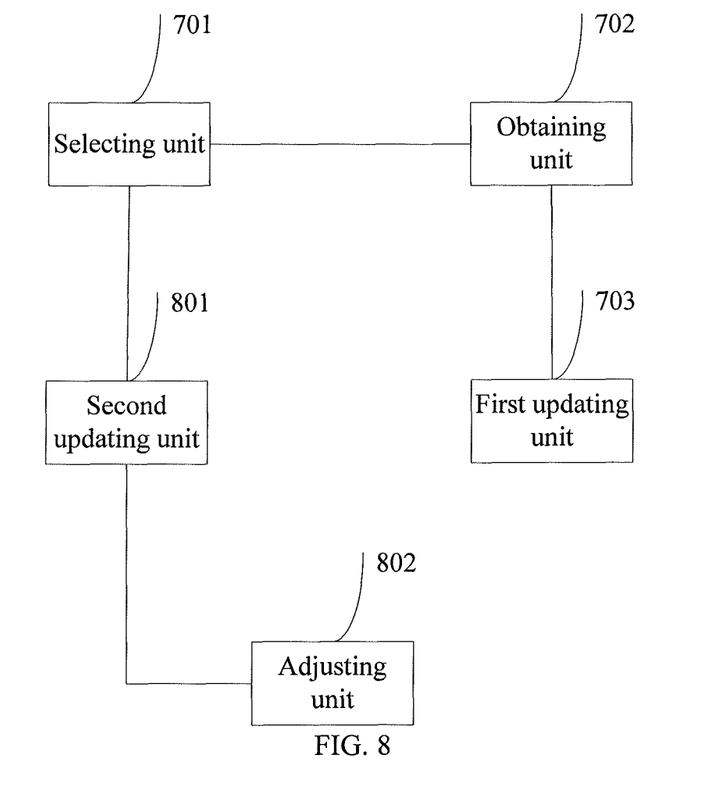
FIG. 8 is a block diagram of an apparatus for maintaining the status of a bootstrap peer according to an exemplary embodiment.

FIG. 8 is a block diagram illustrating an apparatus for maintaining the status of a bootstrap peer. Based on the apparatus structure shown in FIG. 7, the apparatus further includes:

a second updating unit 801, configured to update the status information of the bootstrap peer according to the status information of the bootstrap peer.

In this exemplary embodiment, the apparatus may further include:

an adjusting unit 802, configured to adjust the load between bootstrap peers according to the status information of each updated bootstrap peer.

Figure 9:
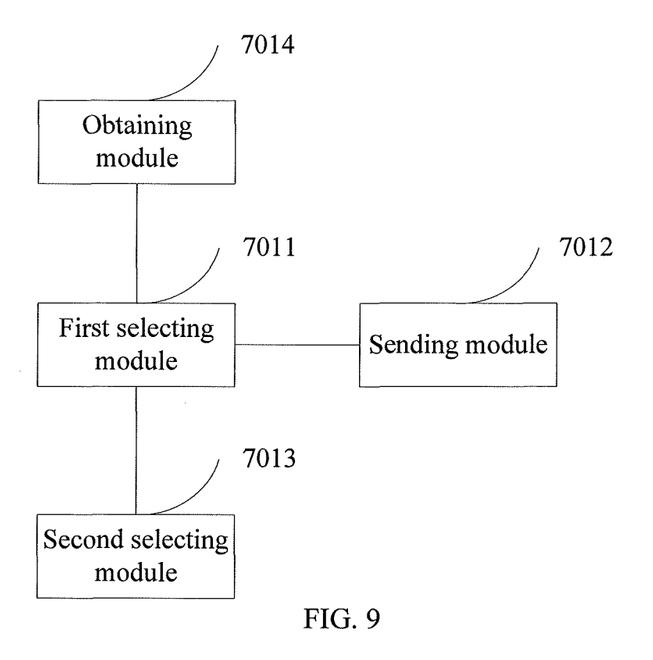
FIG. 9 is a detailed composition block diagram of a selecting unit of the apparatus for maintaining the status of a bootstrap peer according to an exemplary embodiment.

As shown in FIG. 9, based on the apparatus structure shown in FIG. 7, the selecting unit 701 specifically includes:

a first selecting module 7011, configured to select a candidate bootstrap peer according to the obtained peer information;

a sending module 7012, configured to send a notification message to the candidate bootstrap peer; and a second selecting module 7013, configured to select the candidate bootstrap peer as the bootstrap peer after receiving a confirmation message from the candidate bootstrap peer.

In the preceding embodiment, the selecting unit 701 may further include:

an obtaining module 7014, configured to obtain the peer information from a registration server, a diagnosis server, or locally stored peer information.

In the preceding embodiment, the selecting unit specifically includes:

a third selecting module, configured to select the bootstrap peer according to a selection policy with respect to the election result on a P2P overlay network.

In the preceding embodiment, the obtaining unit specifically includes:

a first subscribing module, configured to subscribe to the status information of the bootstrap peer directly; or a second subscribing module, configured to subscribe to the status information of the bootstrap peer through an intermediate proxy device/intermediate proxy system.

In the preceding embodiment, the obtaining unit specifically includes:

a first receiving module, configured to receive the periodically reported status information of the bootstrap peer; or a second receiving module, configured to receive the status information of the bootstrap peer that is periodically reported by the bootstrap peer through an intermediate proxy device/intermediate proxy system.

In the preceding embodiment, the first updating unit is further configured to:

delete the bootstrap peer as a failed bootstrap peer if the status information of the bootstrap peer is not received within a preset time.

In the preceding embodiment, the apparatus further includes:

a presence protocol transferring unit, configured to transfer the status information through a presence protocol.

Figure 10:
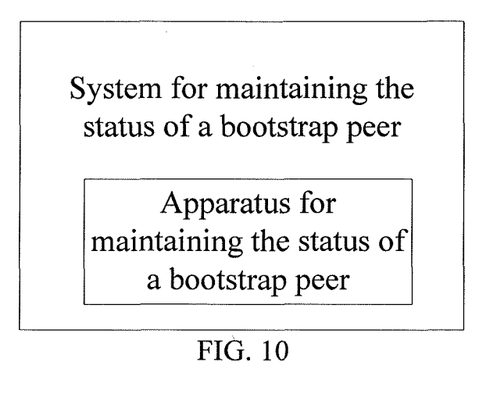
FIG. 10 is a block diagram of a system for maintaining the status of a bootstrap peer according to the first embodiment.

FIG. 10 is the block diagram of a system for maintaining the status of a bootstrap peer according to the first embodiment. The system includes:

the apparatus disclosed herein for maintaining the status of a bootstrap peer.

In the actual application, the system may further include:

a P2P overlay network electing unit, configured to select a bootstrap peer by means of autonomous election on the P2P overlay network.

Through the preceding embodiments, those skilled in the art can easily understood that the present invention can be implemented through software in combination with a necessary hardware platform, or through hardware only. In most cases, the former is a better implementation. Based on such understandings, all or part of the technical solution that makes contributions to the prior art may be embodied in the form of a software product. The software product may be stored in a storage medium. The software product includes a number of instructions that enable a computer device such as a personal computer, a server, or a network device to execute the methods provided in the embodiments.

The preceding exemplary embodiments are not intended to limit the scope of the claims. Applicants understand that many modifications, equivalent replacements, or improvements may be made to the disclosed embodiments without departing from the claims.

What is claimed is:

1. A method for maintaining a status of a bootstrap peer, comprising:

selecting, by a bootstrap server, a bootstrap peer;

obtaining, by the bootstrap server, status information of the bootstrap peer sent from the bootstrap peer, wherein the status information of the bootstrap peer is whether the bootstrap peer is leaving a P2P overlay network; and updating, by the bootstrap server, a local bootstrap peer list according to the status information of the bootstrap peer to ensure the validity of the local bootstrap peer list on the bootstrap server;

updating, by the bootstrap server, the status information of the bootstrap peer in the local bootstrap peer list according to the status information of the bootstrap peer, wherein selecting of the bootstrap peer comprises:

obtaining peer information;

selecting a candidate bootstrap peer according to the obtained peer information;

sending a notification message to the candidate bootstrap peer; and selecting the candidate bootstrap peer as the bootstrap peer after receiving a confirmation message from the candidate bootstrap peer.

2. The method according to claim 1, further comprising:

adjusting a load between bootstrap peers according to the updated status information of each bootstrap peer.

3. The method according to claim 2, wherein adjusting the load between the bootstrap peers according to the updated status information of each bootstrap peer comprising:

returning a relatively idle bootstrap peer to a joining peer wherein the relatively idle bootstrap peer is configured to take on an access task.

4. The method according to claim 1, wherein obtaining of the peer information comprises:
   obtaining the peer information from a registration server, a diagnosis server, or locally stored peer information.

5. The method according to claim 1, wherein selecting of the bootstrap peer comprises:
   selecting the bootstrap peer by means of autonomous election on a peer to peer (P2P) overlay network; or
   with respect to an election result on the P2P overlay network, selecting the bootstrap peer according to a selection policy.

6. The method according to claim 1, wherein obtaining of the status information of the bootstrap peer comprises:
   subscribing to the status information of the bootstrap peer directly; or
   subscribing to the status information of the bootstrap peer through an intermediate proxy device/intermediate proxy system.

7. The method according to claim 1, wherein obtaining of the status information of the bootstrap peer comprises:
   receiving periodically reported status information of the bootstrap peer; or
   receiving the status information of the bootstrap peer that is periodically reported by the bootstrap peer through an intermediate proxy device/intermediate proxy system.

8. The method according to claim 1, wherein updating of the local bootstrap peer list comprises:
   deleting the bootstrap peer as a failed bootstrap peer if the status information of the bootstrap peer is not received within a preset time.

9. An apparatus for maintaining a status of a bootstrap peer, comprising:
   a selecting unit, configured to select a bootstrap peer;
   an obtaining unit, configured to obtain status information of the bootstrap peer sent from the bootstrap peer, wherein the status information of the bootstrap peer is whether the bootstrap peer is leaving a P2P overlay network;
   a first updating unit, configured to update a local bootstrap peer list according to the status information of the bootstrap peer to ensure the validity of the local bootstrap peer list on the bootstrap server;
   a second updating unit, configured to update the status information of the bootstrap peer in the local bootstrap peer list according to the status information of the bootstrap peer,
   wherein the selecting unit comprises:
      a first selecting module, configured to select a candidate bootstrap peer according to the status information of the bootstrap peer;
      a sending module, configured to send a notification message to the candidate bootstrap peer; and
      a second selecting module, configured to select the candidate bootstrap peer as the bootstrap peer after receiving a confirmation message from the candidate bootstrap peer.

10. The apparatus according to claim 9, further comprising:
   an adjusting unit, configured to adjust a load between bootstrap peers according to the updated status information of each bootstrap peer.

11. The apparatus according to claim 10, wherein the adjusting unit is configured to return a relatively idle bootstrap peer to a joining peer wherein the relatively idle bootstrap peer is configured to take on an access task.

12. The apparatus according to claim 9, wherein the selecting unit further comprises:
   an obtaining module, configured to obtain the peer information from a registration server, a diagnosis server, or locally stored peer information.

13. The apparatus according to claim 9, wherein the selecting unit comprises:
   a third selecting module, configured to select the bootstrap peer according to a selection policy with respect to an election result on a peer to peer (P2P) overlay network.

14. The apparatus according to claim 9, wherein the obtaining unit comprises:
   a first subscribing module, configured to subscribe to the status information of the bootstrap peer directly; or
   a second subscribing module, configured to subscribe to the status information of the bootstrap peer through an intermediate proxy device/intermediate proxy system.

15. The apparatus according to claim 9, wherein the obtaining unit comprises:
   a first receiving module, configured to receive periodically reported status information of the bootstrap peer; or
   a second receiving module, configured to receive the status information of the bootstrap peer that is periodically reported by the bootstrap peer through an intermediate proxy device/intermediate proxy system.

16. The apparatus according to claim 9, wherein the first updating unit is further configured to:
   delete the bootstrap peer as a failed bootstrap peer if the status information of the bootstrap peer is not received within a preset time.

17. A system for maintaining the status of a bootstrap peer, comprising:
   a selecting unit, configured to select a bootstrap peer;
   an obtaining unit, configured to obtain status information of the bootstrap peer sent from the bootstrap peer, wherein the status information of the bootstrap peer is whether the bootstrap peer is leaving a P2P overlay network;
   a first updating unit, configured to update a local bootstrap peer list according to the status information of the bootstrap peer to ensure the validity of the local bootstrap peer list on the bootstrap server; and
   a second updating unit, configured to update the status information of the bootstrap peer in the local bootstrap peer list according to the status information of the bootstrap peer,
   wherein the selecting unit comprises:
      a first selecting module, configured to select a candidate bootstrap peer according to the status information of the bootstrap peer;
      a sending module, configured to send a notification message to the candidate bootstrap peer; and
      a second selecting module, configured to select the candidate bootstrap peer as the bootstrap peer after receiving a confirmation message from the candidate bootstrap peer.

18. The system according to claim 17, further comprising:
   a peer to peer (P2P) overlay network electing unit, configured to select the bootstrap peer by means of autonomous election on the P2P overlay network.

* * * * *